(12) United States Patent
Nino Baron et al.

(10) Patent No.: US 10,666,182 B1
(45) Date of Patent: May 26, 2020

(54) SYSTEM TO CONTROL A ROTARY ELECTRIC MACHINE

(71) Applicant: Caterpillar Inc., Deerfield, IL (US)

(72) Inventors: Carlos E. Nino Baron, Edwards, IL (US); Ahmed Khalil, Dunlap, IL (US); Jackson Wai, Dunlap, IL (US); Jesse R. Gerdes, Dunlap, IL (US); Sangameshwar Sonth, Dunlap, IL (US); Amir Saad, Arlington, VA (US)

(73) Assignee: Caterpillar Inc., Deerfield, IL (US)

( * ) Notice: Subject to any disclaimer, the term of this patent is extended or adjusted under 35 U.S.C. 154(b) by 16 days.

(21) Appl. No.: 15/947,540

(22) Filed: Apr. 6, 2018

(51) Int. Cl.
*H02P 25/08* (2016.01)
*H02P 21/18* (2016.01)
*H02P 21/14* (2016.01)
*H02P 6/185* (2016.01)

(52) U.S. Cl.
CPC .............. *H02P 25/08* (2013.01); *H02P 6/185* (2013.01); *H02P 21/141* (2013.01); *H02P 21/18* (2016.02)

(58) Field of Classification Search
CPC ........ H02P 25/08; H02P 21/18; H02P 21/141; H02P 6/185
See application file for complete search history.

(56) References Cited

U.S. PATENT DOCUMENTS

| | | | | |
|---|---|---|---|---|
| 5,097,190 A | * | 3/1992 | Lyons | ................... H02P 25/089 318/400.01 |
| 5,107,195 A | * | 4/1992 | Lyons | ................... H02P 25/089 318/400.2 |
| 5,140,243 A | * | 8/1992 | Lyons | ....................... H02P 6/18 318/701 |
| 5,140,244 A | * | 8/1992 | Lyons | ....................... H02P 6/18 318/761 |
| 5,929,590 A | | 7/1999 | Tang | |
| 5,982,117 A | * | 11/1999 | Taylor | ................... H02P 25/089 318/254.1 |
| 6,246,193 B1 | | 6/2001 | Dister | |

(Continued)

OTHER PUBLICATIONS

Uddin, "Modeling and Control of Fully Pitched Mutually Coupled Switched Reluctance Machines," doctoral dissertation, Univ. of Akron, 207 pp. (Aug. 2016).

*Primary Examiner* — Kawing Chan
*Assistant Examiner* — Bradley R Brown
(74) *Attorney, Agent, or Firm* — Leydig, Voit & Mayer, Ltd.

(57) ABSTRACT

A control system for a rotary electric machine includes a controller configured to generate dynamic input current data based upon a dynamic analysis of self flux data, mutual flux data, and saturation scaling factor data. Upon generating a torque request, the controller is configured to determine a desired electrical input based upon the dynamic input current data to generate the desired output torque. The desired electrical input includes a magnitude and duration of an electrical pulse and a desired angular position of the rotor of the rotary electric machine relative to the stator of the machine. The controller determines an angular position of the rotor and generates an operating command to generate the desired electrical input at the desired angular position of the rotor to propel the rotary electric machine and generate the desired output torque. A rotary electric machine and method of operating same are provided.

20 Claims, 13 Drawing Sheets

(56) References Cited

U.S. PATENT DOCUMENTS

| | | | | |
|---|---|---|---|---|
| 7,271,556 B2* | 9/2007 | Kishibe | ............... | H02P 25/089 |
| | | | | 318/254.2 |
| 8,125,170 B2* | 2/2012 | Fahimi | ............... | G01R 27/2611 |
| | | | | 318/400.34 |
| 8,624,543 B2* | 1/2014 | Khalil | ................... | H02P 25/08 |
| | | | | 318/400.07 |
| 8,624,564 B2* | 1/2014 | Hartman | ................. | H02P 9/08 |
| | | | | 290/52 |
| 8,773,056 B2* | 7/2014 | Gerdes | ............... | H02P 25/0805 |
| | | | | 318/400.02 |
| 8,866,433 B2* | 10/2014 | Gerdes | ................ | H02P 25/083 |
| | | | | 318/701 |
| 9,099,954 B2* | 8/2015 | Wai | .................... | H02P 25/0925 |
| 9,391,555 B2* | 7/2016 | Wai | ...................... | H02P 25/086 |
| 9,702,938 B2* | 7/2017 | Gerdes | ................ | B60L 3/0061 |
| 9,800,192 B1* | 10/2017 | Han | ....................... | H02P 23/14 |
| 2017/0229992 A1* | 8/2017 | Han | ..................... | H02P 25/089 |

\* cited by examiner

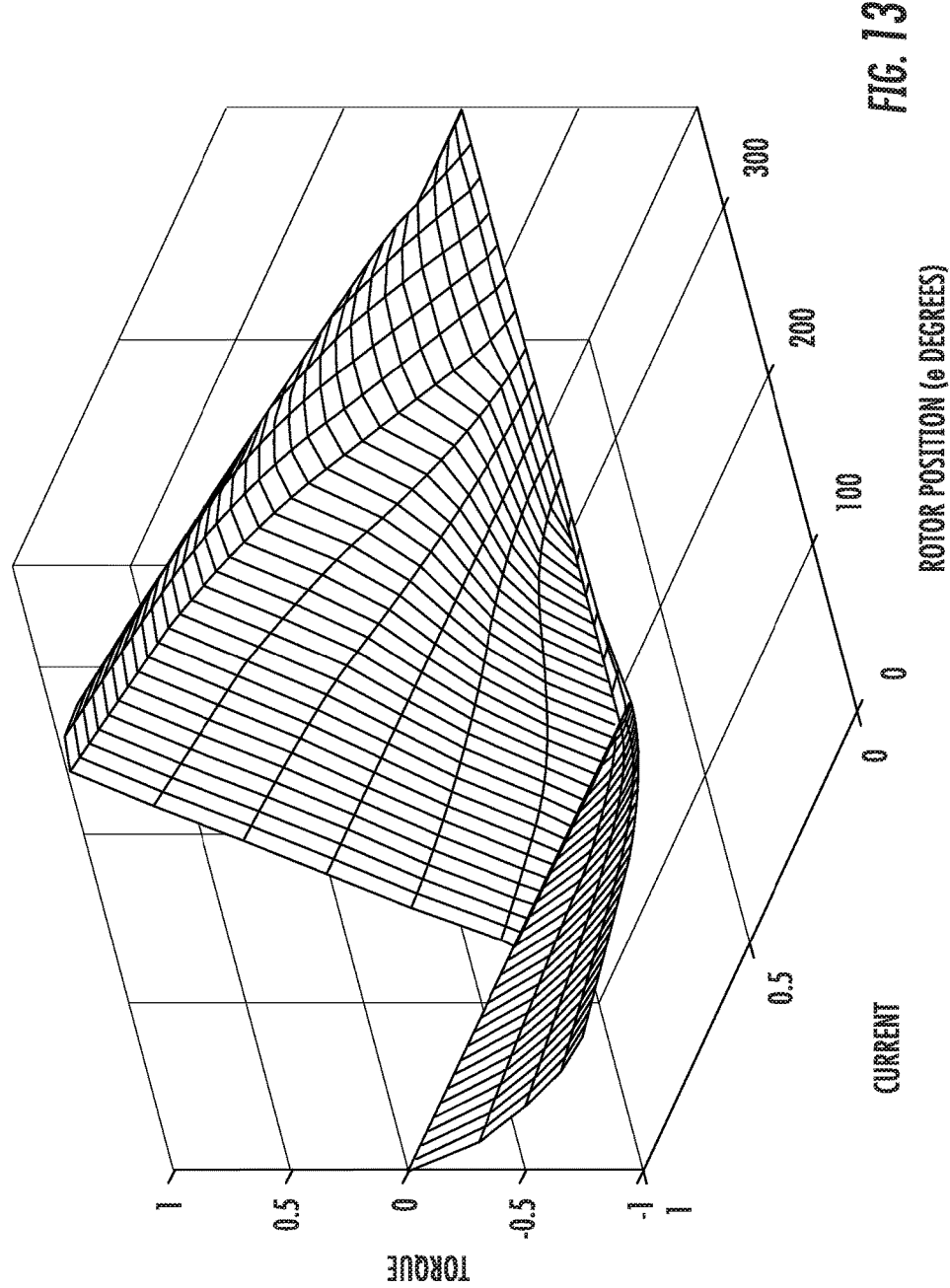

SYSTEM TO CONTROL A ROTARY ELECTRIC MACHINE

TECHNICAL FIELD

This disclosure relates generally to a rotary electric machine and, more particularly, to a system for generating control data to optimize the performance of a rotary electric machine and subsequently operating the machine based upon the control data.

BACKGROUND

Work machines may be powered by electrical systems. In some instances, an electrical propulsion system will include an electric drive traction system that provides driving forces to traction devices of the work machines. In some electric drive traction systems, switched reluctance motors are used to provide the driving force.

Switched reluctance motors may have various motor topologies (e.g., the number of stator poles, the number of coils, and the number of rotor poles). In addition, a switched reluctance motor may be configured with a plurality of phases (e.g., 2 phases, 3 phases, 4 phases, or more). A switched reluctance motor may have a plurality of stator poles, each with a winding of electrically conductive wires or coil positioned therearound. The number of wires and the configuration of the coil is one factor that affects the efficiency of the operation of the switched reluctance motor.

Control systems are often used to control the operation of the switched reluctance motors. A controller of the control system may generate a command to generate a series of electrical pulses of a desired magnitude and duration to generate a desired output torque. The data used to control the switched reluctance motors may be generated based upon empirical data or data generated as a result of simulations. When using simulated data to control a switched reluctance motor, the efficiency of the operation will be dependent upon the accuracy of the simulation. In many instances, the simulations only analyze the self flux resulting from the input current and thus the data generated by the simulation may result in a machine operating at less than ideal efficiency.

U.S. Pat. No. 8,125,170 discloses a technique and apparatus for measuring mutual inductance in a switched reluctance machine. Different techniques are disclosed to determine empirical data for the mutual inductance. A method of making a switched reluctance motor fault tolerant is also disclosed.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a control system for a rotary electric machine is provided. The rotary electric machine includes a stator having a plurality of stator poles, a plurality of coils wrapped around the plurality of stator poles, and a rotor having a plurality of rotor poles, with the rotor being rotatable relative to the stator. The control system includes a rotor position sensor configured to determine an angular position of the rotor relative to the stator and a controller. The controller is configured to access a plurality of characteristics of the rotary electric machine including a number of the plurality of stator poles, a number of the plurality of rotor poles, a number of electrical phases, and a number of windings of each of the plurality of coils, access a plurality of self flux data, with the plurality of self flux data being a function of the angular position of the rotor, access a plurality of mutual flux data between an energized electrical phase and a non-energized electrical phase of the rotary electric machine, with the plurality of mutual flux data being a function of the angular position of the rotor, and access a plurality of saturation scaling factor data, with the plurality of saturation scaling factor data being based upon the plurality of self flux data. The controller is also configured to generate a plurality of dynamic input current data based upon a dynamic analysis of the plurality of self flux data, the plurality of mutual flux data, and the plurality of saturation factor data, generate a torque request corresponding to a desired output torque, and determine a desired electrical input based upon the plurality of dynamic input current data to generate torque corresponding to the desired output torque, with the desired electrical input including a magnitude and duration of an electrical pulse and a desired angular position of the rotor relative to the stator. The controller is further configured to determine an angular position of the rotor based upon the rotor position sensor and generate an operating command to generate the desired electrical input at the desired angular position of the rotor to propel the rotary electric machine and generate the desired output torque.

In another aspect, a method of controlling a rotary electric machine is provided. The rotary electric machine includes a stator having a plurality of stator poles, a plurality of coils wrapped around the plurality of stator poles, and a rotor having a plurality of rotor poles, with the rotor being rotatable relative to the stator. The method includes accessing a plurality of characteristics of the rotary electric machine including a number of stator poles, a number of rotor poles, a number of electrical phases, and a number of windings of each of the plurality of coils, accessing a plurality of self flux data, with the plurality of self flux data being a function of an angular position of the rotor, and accessing a plurality of mutual flux data between an energized electrical phase and a non-energized electrical phase, with the plurality of mutual flux data being a function of the angular position of the rotor. The method also includes accessing a plurality of saturation scaling factor data, with the plurality of saturation scaling factor data being based upon the plurality of self flux data, generating a plurality of dynamic input current data based upon a dynamic analysis of the plurality of self flux data, the plurality of mutual flux data, and the plurality of saturation scaling factor data, and generating a torque request corresponding to a desired output torque. The method further includes determining a desired electrical input based upon the plurality of dynamic input current data to generate torque corresponding to the desired output torque, with the desired electrical input including a magnitude and duration of an electrical pulse and a desired angular position of the rotor relative to the stator, determining a rotor position based upon a rotor position sensor, and generating an operating command to generate the desired electrical input at the desired angular position of the rotor to propel the rotary electric machine and generate the desired output torque.

In still another aspect, a rotary electric machine includes a stator having a plurality of stator poles, a plurality of coils wrapped around the plurality of stator poles, a rotor having a plurality of rotor poles, the rotor being rotatable relative to the stator, a rotor position sensor configured to determine an angular position of the rotor relative to the stator and a controller. The controller is configured to access a plurality of characteristics of the rotary electric machine including a number of the plurality of stator poles, a number of the plurality of rotor poles, a number of electrical phases, and a number of windings of each of the plurality of coils, access a plurality of self flux data, with the plurality of self flux data being a function of the angular position of the rotor, access a plurality of mutual flux data between an energized electrical phase and a non-energized electrical phase of the rotary electric machine, with the plurality of mutual flux data being a function of the angular position of the rotor, and access a plurality of saturation scaling factor data, with the plurality of saturation scaling factor data being based upon the plurality of self flux data. The controller is also configured to generate a plurality of dynamic input current data based upon a dynamic analysis of the plurality of self flux data, the plurality of mutual flux data, and the plurality of saturation factor data, generate a torque request corresponding to a desired output torque, and determine a desired electrical input based upon the plurality of dynamic input current data to generate torque corresponding to the desired output torque, with the desired electrical input including a magnitude and duration of an electrical pulse and a desired angular position of the rotor relative to the stator. The controller is further configured to determine an angular position of the rotor based upon the rotor position sensor and generate an operating command to generate the desired electrical input at the desired angular position of the rotor to propel the rotary electric machine and generate the desired output torque.

BRIEF DESCRIPTION OF THE DRAWINGS

FIG. 13 is a 3-D graph of the torque generated by the switched reluctance motor as a function of current within the first phase and the rotor position.

DETAILED DESCRIPTION

Figure 1:
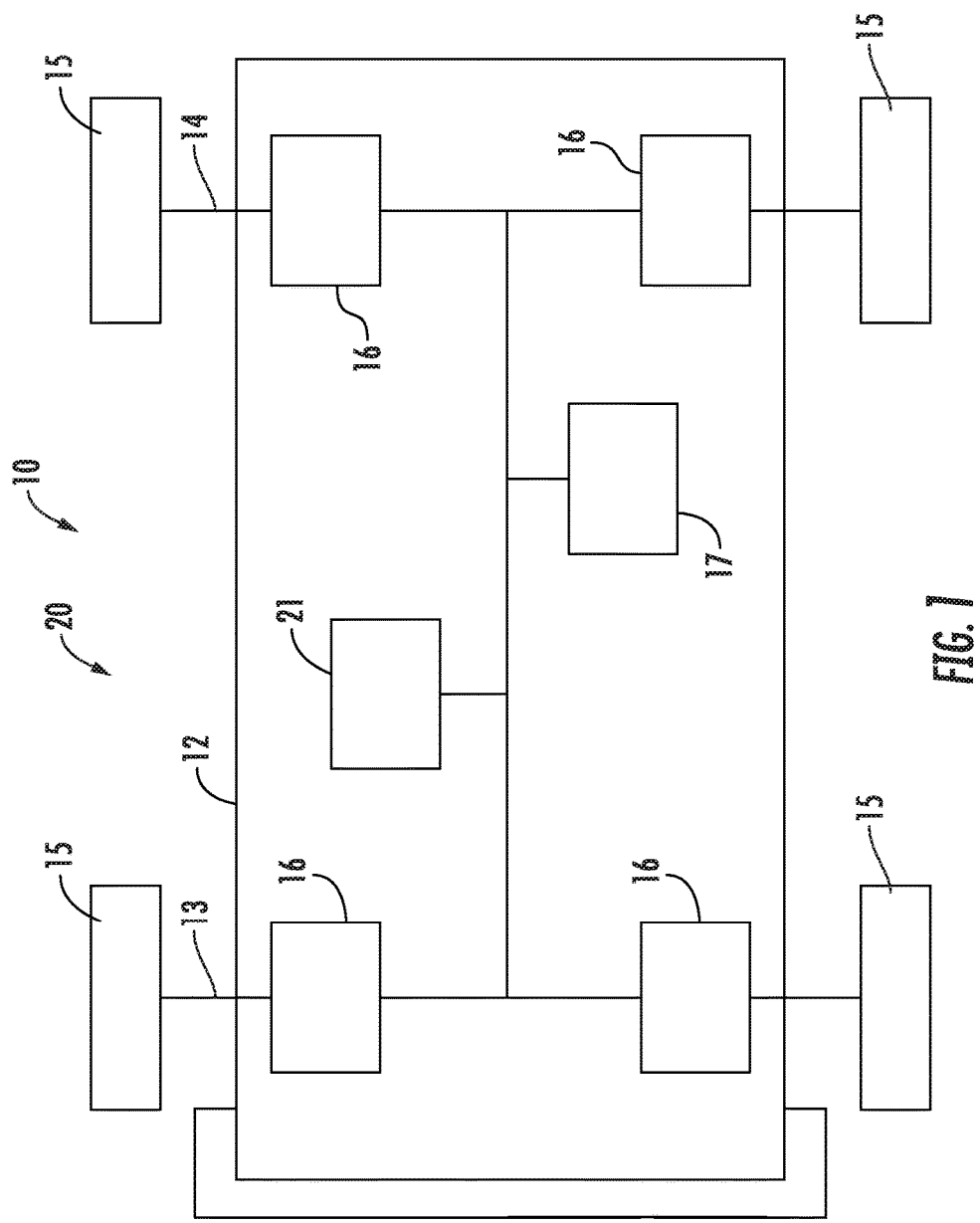
FIG. 1 is a diagrammatic view of a work machine incorporating aspects of the disclosure.

Referring to FIG. 1, a machine 10 is schematically depicted including a chassis 12 with a front axle 13 and a rear axle 14. A ground engaging drive mechanism 15 (e.g., wheels, tracks, etc.) may be mounted on each end of each axle and may be driven by a rotary electric or switched reluctance machine 16, such as a switched reluctance motor. A power source 17 provides electrical power to each switched reluctance machine 16. Power source 17 may include a prime mover (not shown) such as an internal combustion engine (e.g., diesel engine, gasoline engine, natural gas engine) coupled with a generator (not shown) to supply electrical power to the switched reluctance machine 16. In another embodiment, power source 17 may be a fuel cell, a wind turbine, a battery, or another desired energy source configured to supply directly electrical power to each switched reluctance machine 16. Still further, power source 17 may include a hybrid system including two or more different types of devices for converting an energy supply to electrical energy or for directly supplying electrical energy.

A control system indicated generally at 20 to indicate association with the machine 10 may operate to control the operation of the switched reluctance machines 16 as well as the power source 17 and other components and systems of the machine. The control system 20 may include an electronic control module or controller 21 configured to control the operation of various aspects of the machine 10 including the operation of the switched reluctance machines 16.

Control system 20 may also include one or more sensors or systems that operate similar to a sensor to provide data and other input signals representative of various operating parameters of the machine 10 and the switched reluctance machine 16.

The controller 21 may be an electronic controller that operates in a logical fashion to perform operations, execute control algorithms, store and retrieve data and other desired operations. The controller 21 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 21 such as power supply circuitry, signal conditioning circuitry, driver circuitry, and other types of circuitry.

The controller 21 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine 10. The functionality of the controller 21 may be implemented in hardware and/or software without regard to the functionality.

The controller 21 may rely on one or more data maps relating to the operating conditions and the operating environment of the machine 10 and the switched reluctance machine 16 that may be stored in the memory of or associated with the controller. Each of these data maps may include a collection of data in the form of tables, graphs, and/or equations to maximize the performance and efficiency of the machine 10 and the switched reluctance machine 16. In particular, the data maps stored within or associated with the controller 21 may include information to optimize and improve the performance of the switched reluctance machines 16.

Figure 2:
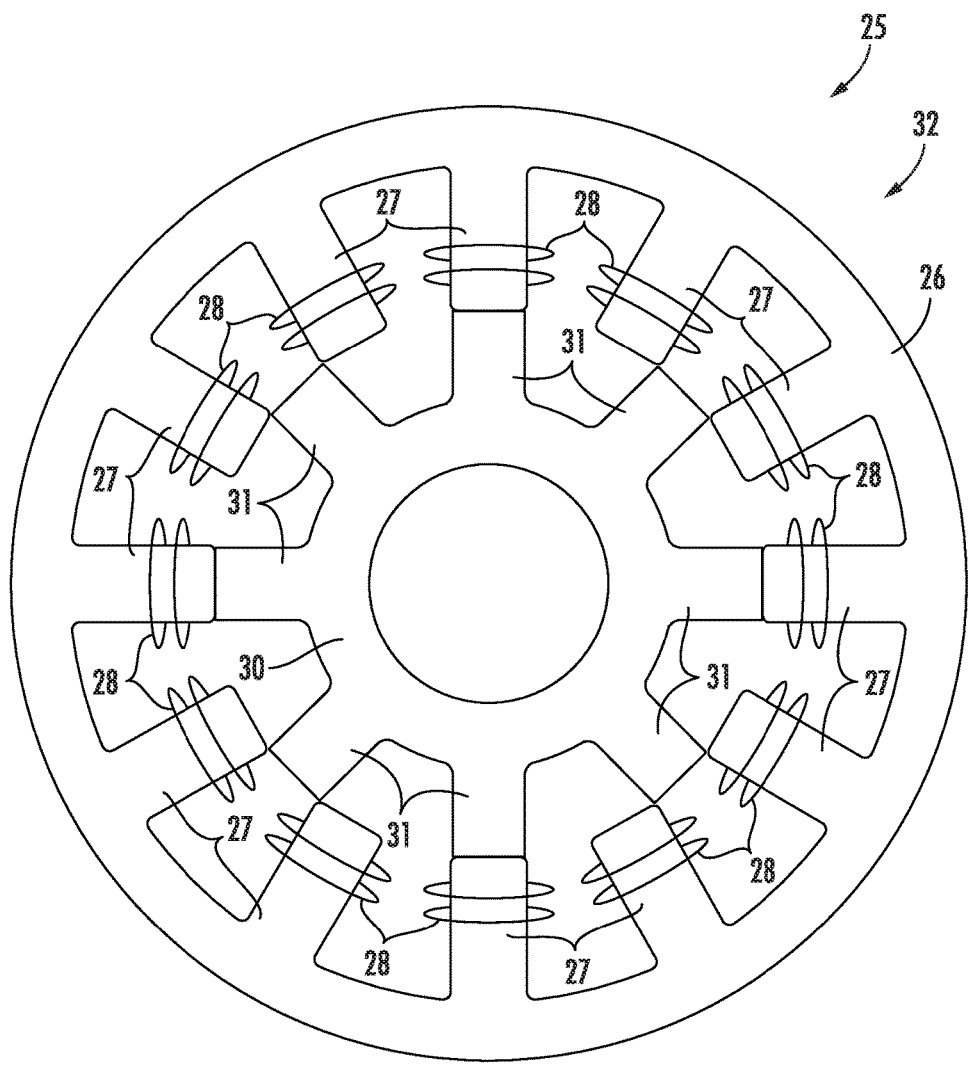
FIG. 2 is a diagrammatic view of a portion of a switched reluctance motor in accordance with the disclosure.

FIG. 2 depicts a schematic view of a rotary electric machine such as a switched reluctance machine configured as a switched reluctance motor 25. The switched reluctance motor 25 has a stator 26 including a first plurality of stator poles 27 and rotor 30, rotatable relative to the stator, with a second plurality of rotor poles 31. As depicted in FIG. 2, an 12/8 3-phase switched reluctance motor 25 includes twelve stator poles 27, eight rotor poles 31, and 3-phases of electrical conduction. The number of phases as well as the number of stator poles 27 and rotor poles 31 is exemplary only and is not intended to be limiting.

The stator poles 27 may be electrically grouped in two or more stator pole sets that correspond to the number of phases (e.g., 3) of the switched reluctance motor 25. In the depicted example, the twelve stator poles 27 are grouped in three phase sets. Each stator pole 27 has a conductive winding or coil 28 wrapped therearound. The coils 28 positioned about the stator poles 27 of each group of a phase set are electrically connected and may be configured as part of an electrical circuit, either in parallel or in series. The coils 28 are electrically connected to the control system 20 and/or controller 21 so they may operate as a power source to provide input signals in the form of electrical pulses having a desired magnitude, timing, duration may be provided or applied to the coils.

Switched reluctance motor 25 has a rotor 30 with no windings or magnets. The rotor 30 may be formed of a stack of vertically laminated iron, one-piece continuous annular members (not shown). Rotors 30 having other structures and configurations are contemplated. In addition, while the motor of FIG. 2 is depicted as a switched reluctance motor, the concepts disclosed herein are applicable to other rotary electric machines such as a switched reluctance generator.

During operation of the switched reluctance motor 25, rotation of the rotor 30 is achieved by the sequential excitation or energization of adjacent sets of stator poles 27 by supplying voltage pulses of a desired magnitude and duration to generate a DC current within the coils 28 of the stator poles 27. Energization of the stator poles 27 creates magnetic flux towards which the rotor poles 31 are attracted, which tends to align the rotor poles 31 with the energized stator poles 27. As the rotor poles 31 become aligned with the energized stator poles 27, the voltage pulse and thus the DC current to the energized poles is terminated and subsequently supplied to the next sequential stator poles 27. The rotor poles 31 are then attracted to the next set of sequential poles, which causes continued rotation of the rotor 30. This process is continued during operation of the switched reluctance motor 25. Torque is generated by the tendency of rotor poles 31 to align with energized stator poles 27. Continuous torque may be generated by synchronizing excitation of consecutive stator poles 27 with the instantaneous position of rotor poles 31.

Many systems and techniques are known for determining the position of the rotor relative to the stator. Some systems utilize position sensors. Other systems monitor various electrical conditions to determine the position of the relative position of the rotor. As used here, a rotor position sensor generally indicated at 32 in FIG. 2 refers to a sensor or system for configured to determine the angular position of the rotor 30 relative to the stator 26.

INDUSTRIAL APPLICABILITY

The industrial applicability of the rotary electric machine described herein will be readily appreciated from the foregoing discussion. The foregoing discussion is applicable to rotary electric machines such as switched reluctance motors 25 in which it is desirable to accurately map the performance of the rotary electric machine over a range of operating conditions and thus improve the efficiency of operation of the rotary electric machine.

The rotary electric machine may be used with any type of machine 10, either mobile or fixed. Such machine 10 may be used with any industry and at any work site or in any environment, such as construction, mining, forestry, agriculture, transportation, power generation, etc.

During operation of the machine 10, input commands may be generated to operate the machine in a desired manner. In one example, a machine operator or the control system 20, if the machine 10 is operating autonomously or semi-autonomously, may generate an input command to propel the machine. The input command may result in the generation of an operating command requiring a specified torque to operate the machine with a desired accelerator or at a desired speed. The controller 21 may command the desired torque output by generating the appropriate operating commands to control the input voltage (e.g., magnitude and timing) for each electrical phase of each switched reluctance motor 25. More specifically, the output torque is a function of the amount of input current, which is a function of the input voltage, as well as the position of the rotor 30 at the time the input voltage is applied and turned off. It will be understood that the same output torque may be generated for many different input voltages, depending upon the position of the rotor 30 relative to the stator 26. Similarly, different output torques may be generated by the same input voltage depending upon the position of the rotor 30 relative to the stator 26 at the time of turning on and off the voltage input. However, some manners of operation may be more efficient than others.

It is often desirable to provide a specified amount of output torque in the most efficient manner. In many instances, the most efficient manner of generating an output torque is through the application of a minimum amount of input current. The application of greater than the minimum current typically results in additional losses in the form of additional heat, which thus requires additional cooling and may require an increase in capacity.

When generating the appropriate commands (e.g., magnitude and timing of the voltage pulses) to generate the desired torque, the controller 21 may refer to data maps stored within or accessed by the controller 21. The efficiency of the operation of the switched reluctance motors 25 will be based upon the data stored within the data maps controlling the switched reluctance motors. Accordingly, the efficiency of operation of the switched reluctance motors 25 is directly dependent upon the manner in which the data stored in the data maps is generated and its accuracy.

An improved manner of controlling a switched reluctance machine 16 such as switched reluctance motor 25 is disclosed herein as a result of improved modeling of the machine. Such an improved model results in more accurate data stored within the controller 21 and more accurate control of the switched reluctance machine 16, which increases the likelihood that the switched reluctance motor 25 will be operated in an efficient manner while generating the desired torque.

Figure 3:
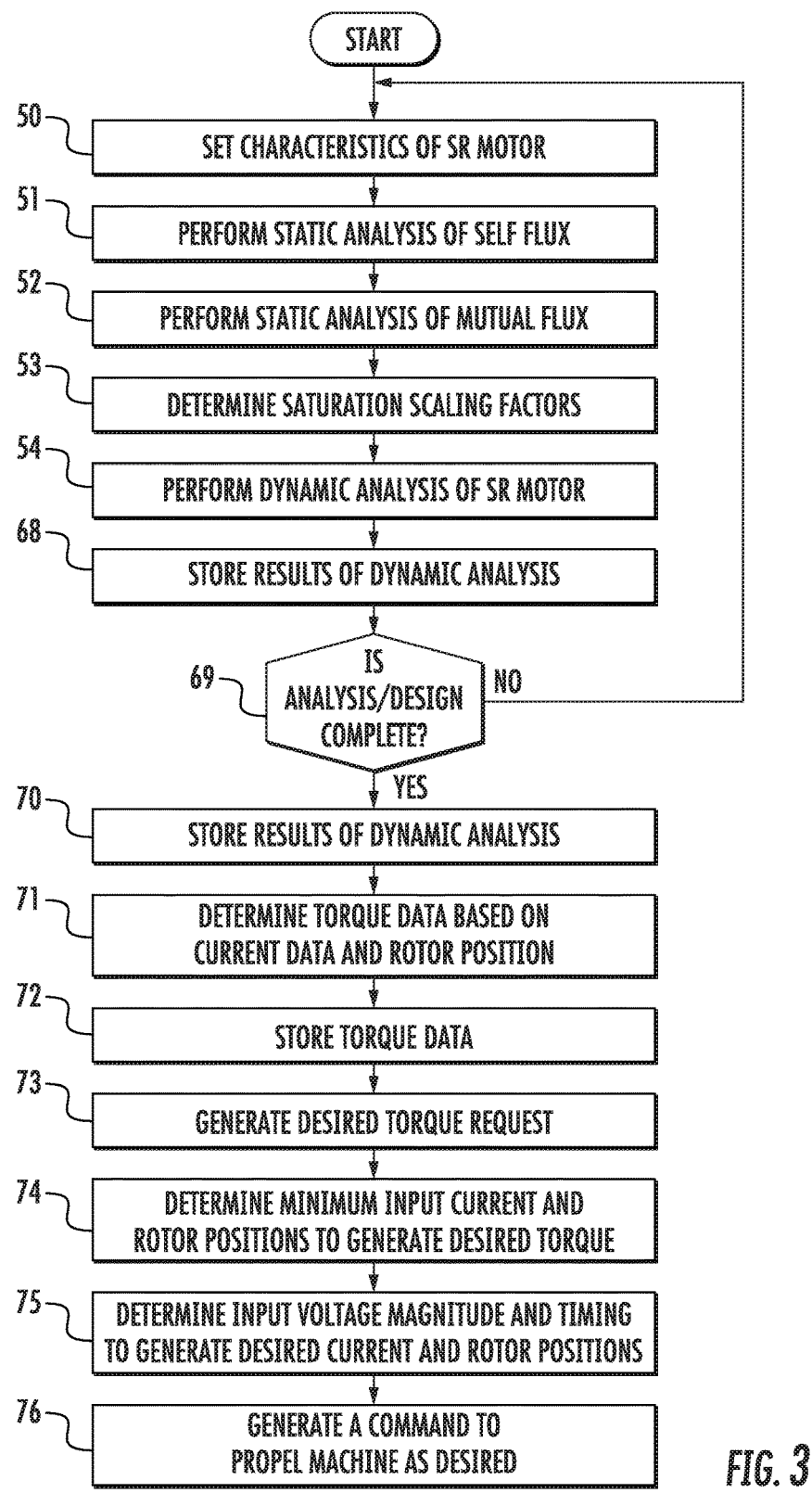
FIG. 3 is a flowchart illustrating a process for generating data for operating a switched reluctance motor and for using the data to subsequently operate a machine incorporating the switched reluctance motor.

Referring to FIG. 3, a flowchart of a method of generating data for controlling a switched reluctance machine 16 and subsequently using the data to operate a machine 10 incorporating the switched reluctance machine is depicted. At stage 50, characteristics of the switched reluctance machine 16, such as switched reluctance motor 25, are set or stored. The characteristics may include the size and number of stator poles 27, the size and number of rotor poles 31, the type and connection of the windings surrounding the stator poles, and the thickness of both the stator poles and the rotor poles as well as the material from which they are formed.

At stage 51, a static analysis of the self-inductance or self flux associated with each phase may be performed and the data saved. In one example, the analysis may be performed through a finite element analysis. Other methods are contemplated. The analysis may determine the amount of flux generated by a specific phase as a function of or based upon the current and position $\theta$ of the rotor 30 relative to the first phase. The position $\theta$ of the rotor 30 may be determined in any desired manner such as through the use of rotor position sensor 32. An example of a 3-D graph of the self flux generated by the exemplary switched reluctance motor 25 is depicted in FIG. 4.

Figure 4:
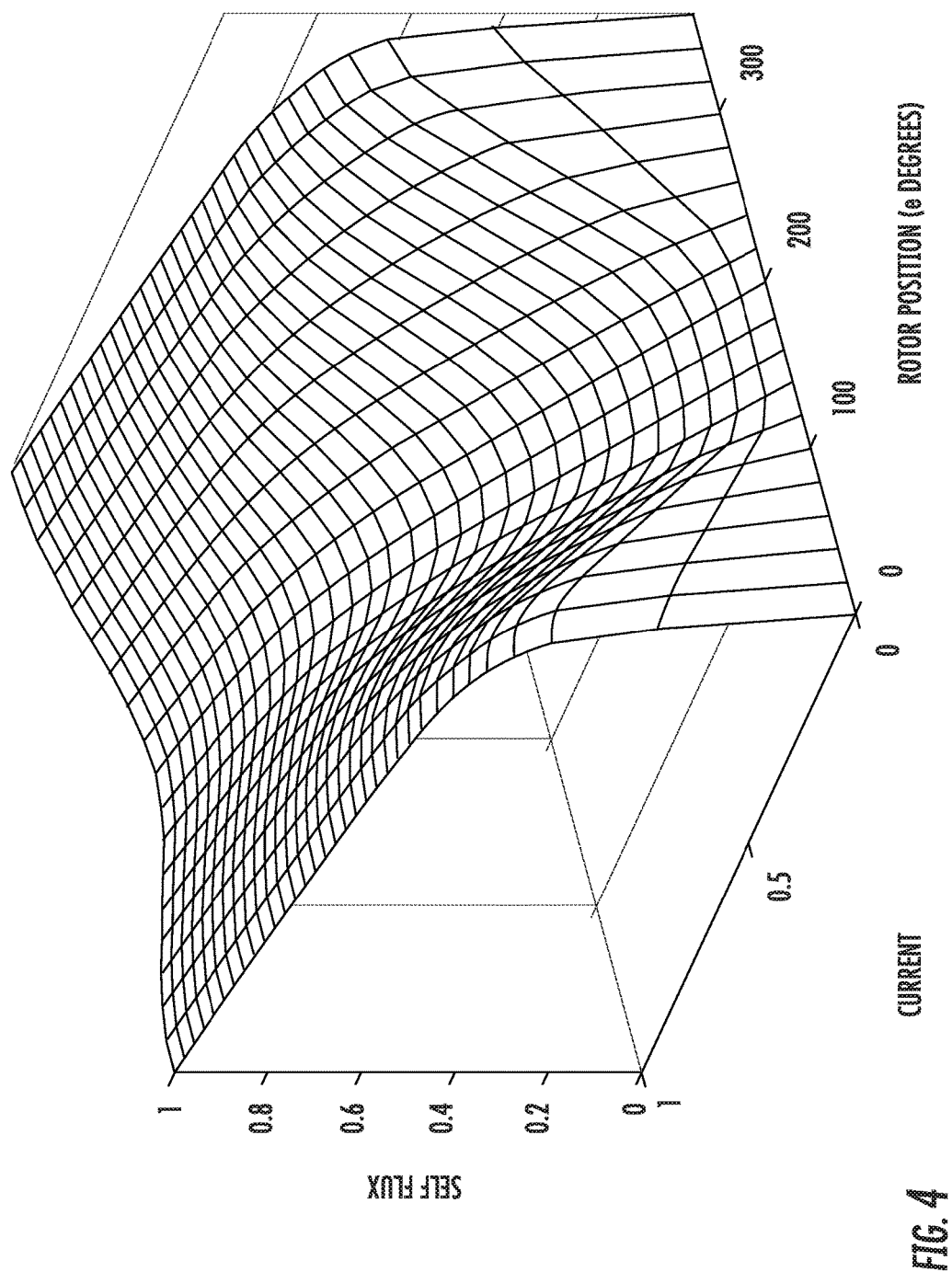
FIG. 4 is a 3-D graph of self flux as a function of the current within a phase and the rotor position.

Since the switched reluctance motor 25 is configured symmetrically with three phases, the self flux for each of the other two phases does not need to be recalculated but will be identical to the self flux graph of FIG. 4 but with the rotor position offset by 120° for each phase. In other words, the self flux for the second phase will be identical to the graph of FIG. 4 but with 120° added to each rotor position. Similarly, the self flux for the third phase will be identical to the graph of FIG. 4 but with 240° added to each rotor position.

Figure 5:
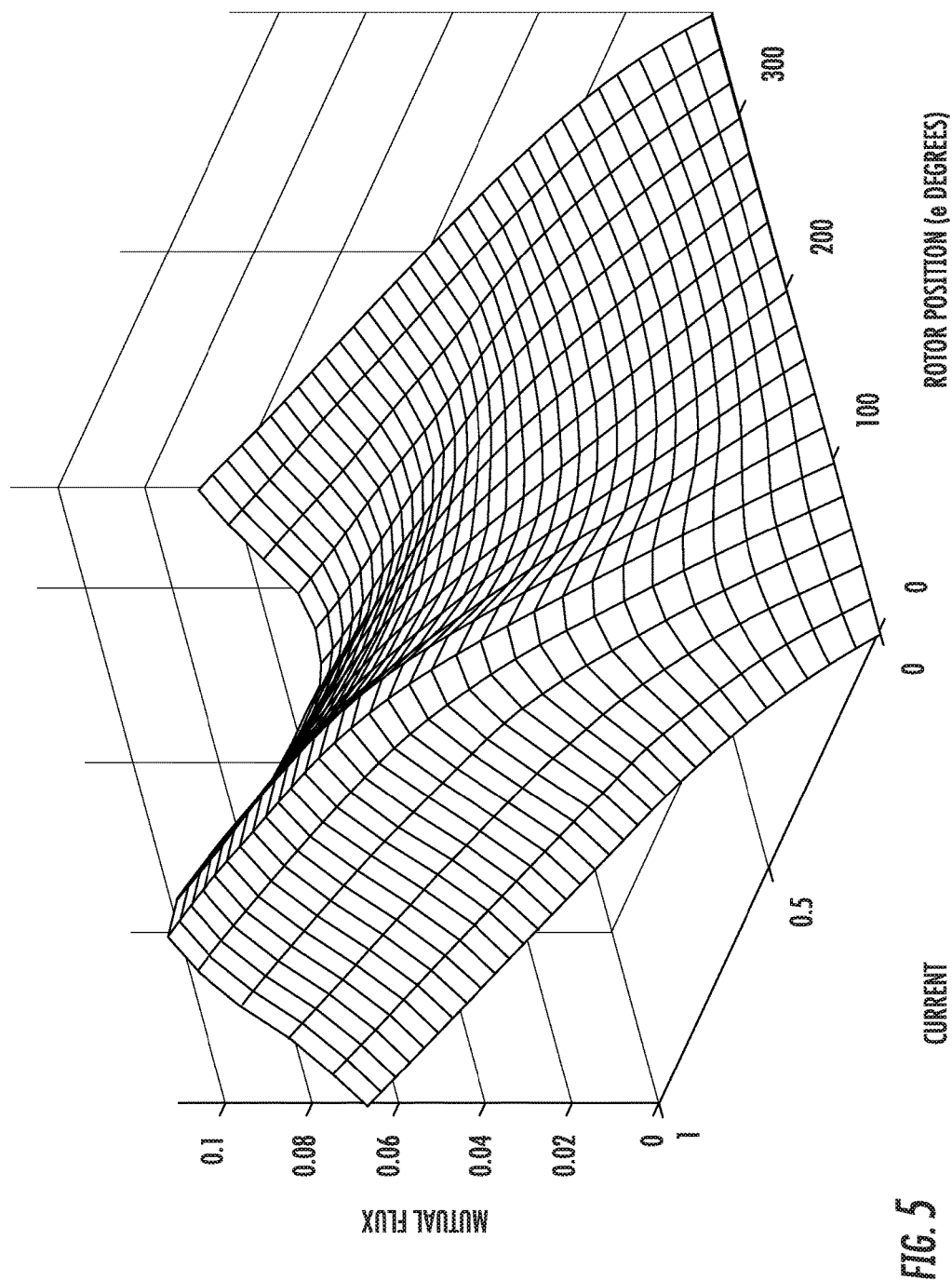
FIG. 5 is a 3-D graph of mutual flux between a first phase and a second phase as a function of the current within the first phase and the rotor position.
Figure 6:
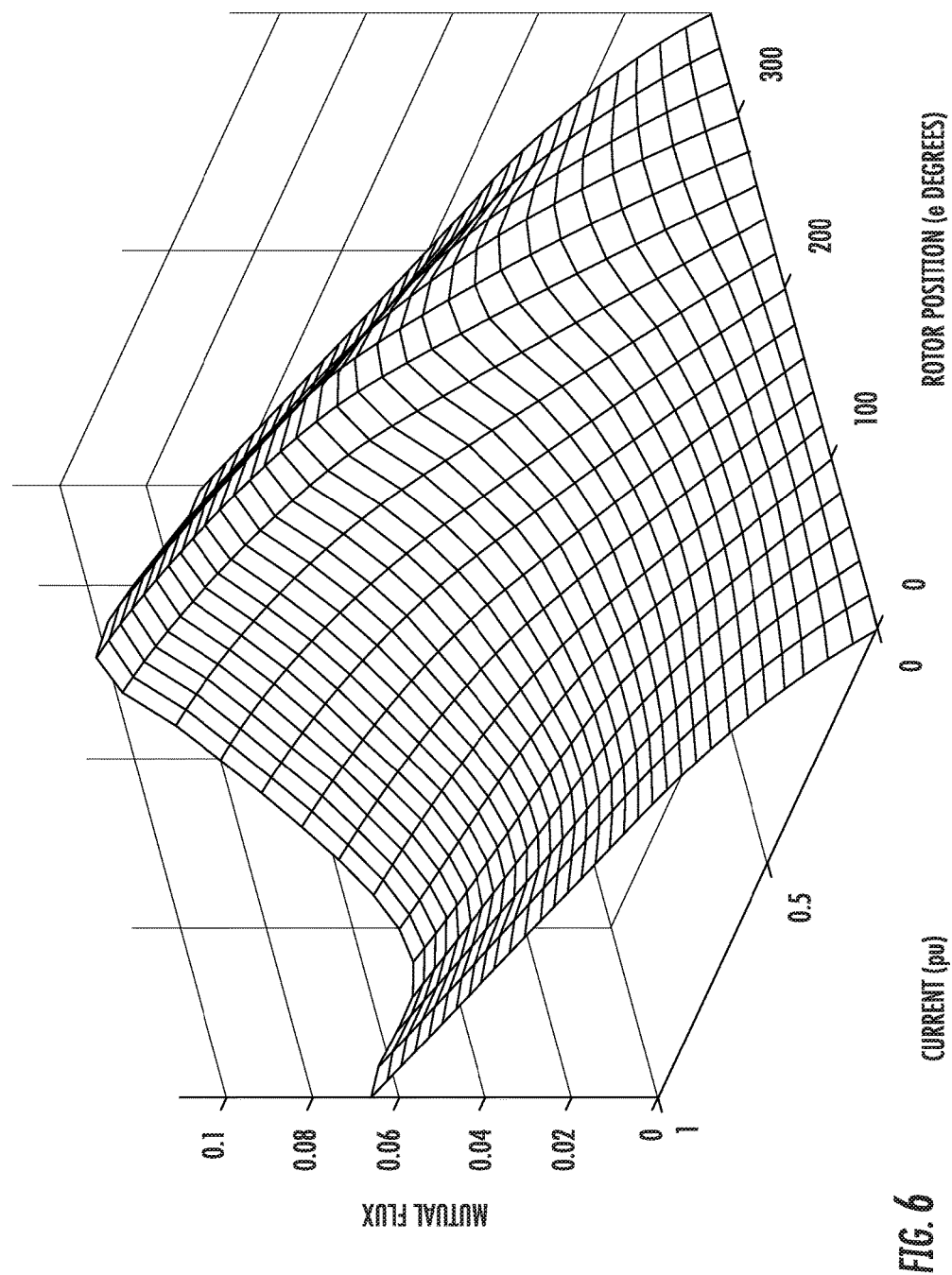
FIG. 6 is a 3-D graph of mutual flux between a first phase and a third phase as a function of the current within the first phase and the rotor position.

A static analysis of the mutual inductance or mutual flux between the coil 28 of the excited or energized phase and the coils of the non-energized electrical phases may be performed at stage 52 and the data saved. In one example, the analysis may be performed through a finite element analysis. Other methods are contemplated. The analysis is operative to determine the amount of flux passing from the energized phase to the other non-energized phases during the operation of the switched reluctance motor 25. More specifically, flux generated by an energized phase may pass or leak to the coils 28 associated with the other non-energized phases. Examples of 3-D graphs of the mutual flux generated by the exemplary switched reluctance motor 25 are depicted in FIGS. 5-6. More specifically, FIG. 5 depicts the mutual flux between the first and second phases while FIG. 6 depicts the mutual flux between the first and third phases. Since the switched reluctance motor 25 is configured symmetrically with three phases, the mutual flux between the other phases does not need to be recalculated but will be identical to the mutual flux graph of FIGS. 5-6 but with the rotor position offset by 120° for each phase.

Figure 7:
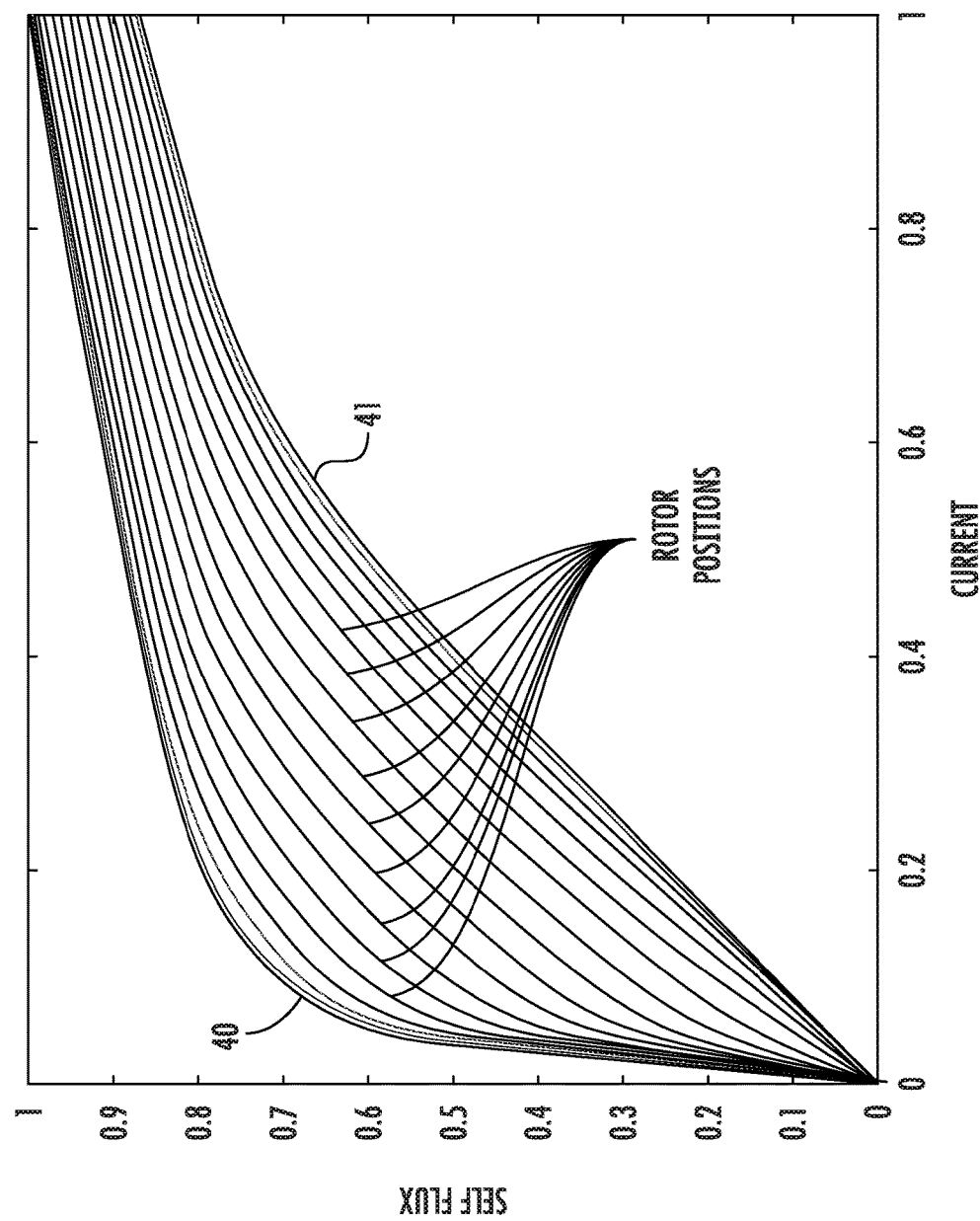
FIG. 7 is a graph of self flux as a function of the current within a phase and depicting a plurality of rotor positions.

During some instances of operation, the switched reluctance motor 25 may become saturated limiting the amount of flux that may be generated by the phases. In such case, the performance of the switched reluctance motor 25 may not be linear. For example, saturation of the switched reluctance motor 25 increases as the self flux curves, as a function of current, become more horizontal. Referring to FIG. 7 which is a 2-D graph of FIG. 5, the more vertical the self flux curves, the less saturation, while the more horizontal the curves, the greater the saturation.

In order to account for the saturation of the switched reluctance motor, a saturation scaling factor may be generated at stage 53. The saturation scaling factor data may be calculated based upon the current of the energized phase and the rotor position. More specifically, the saturation scaling factor data is generated by determining the slope or rate of change of each plot of the self flux and then normalizing or scaling the slope so that the saturation scaling factor has a maximum value of 1.0.

Figure 8:
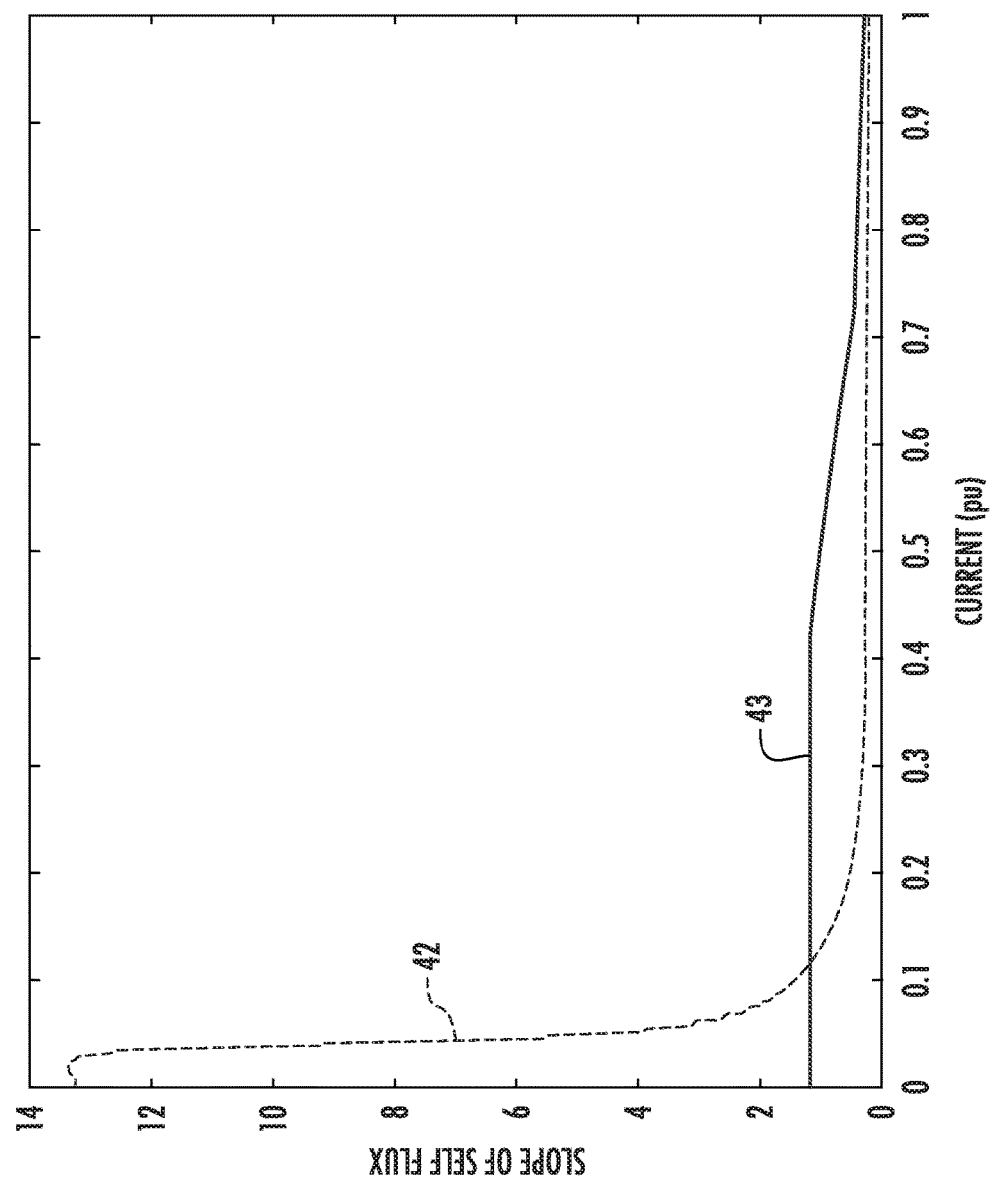
FIG. 8 is a graph of the slope of the self flux as a function of the current within a phase for two different rotor positions.

Referring to FIG. 7, in one example, for a first rotor position of 0° identified at 40, the flux increases very rapidly as a function of current and then the rate of increase slows relatively quickly. The slope of the curve corresponding to rotor position 40 is depicted at 42 in FIG. 8. In a second example, for a second rotor position of 180° identified at 41 in FIG. 7, the flux increases relatively slowly and linearly as a function of current before the rate of increase slows. The slope of the curve corresponding to rotor position 41 is depicted at 43 in FIG. 8.

Figure 9:
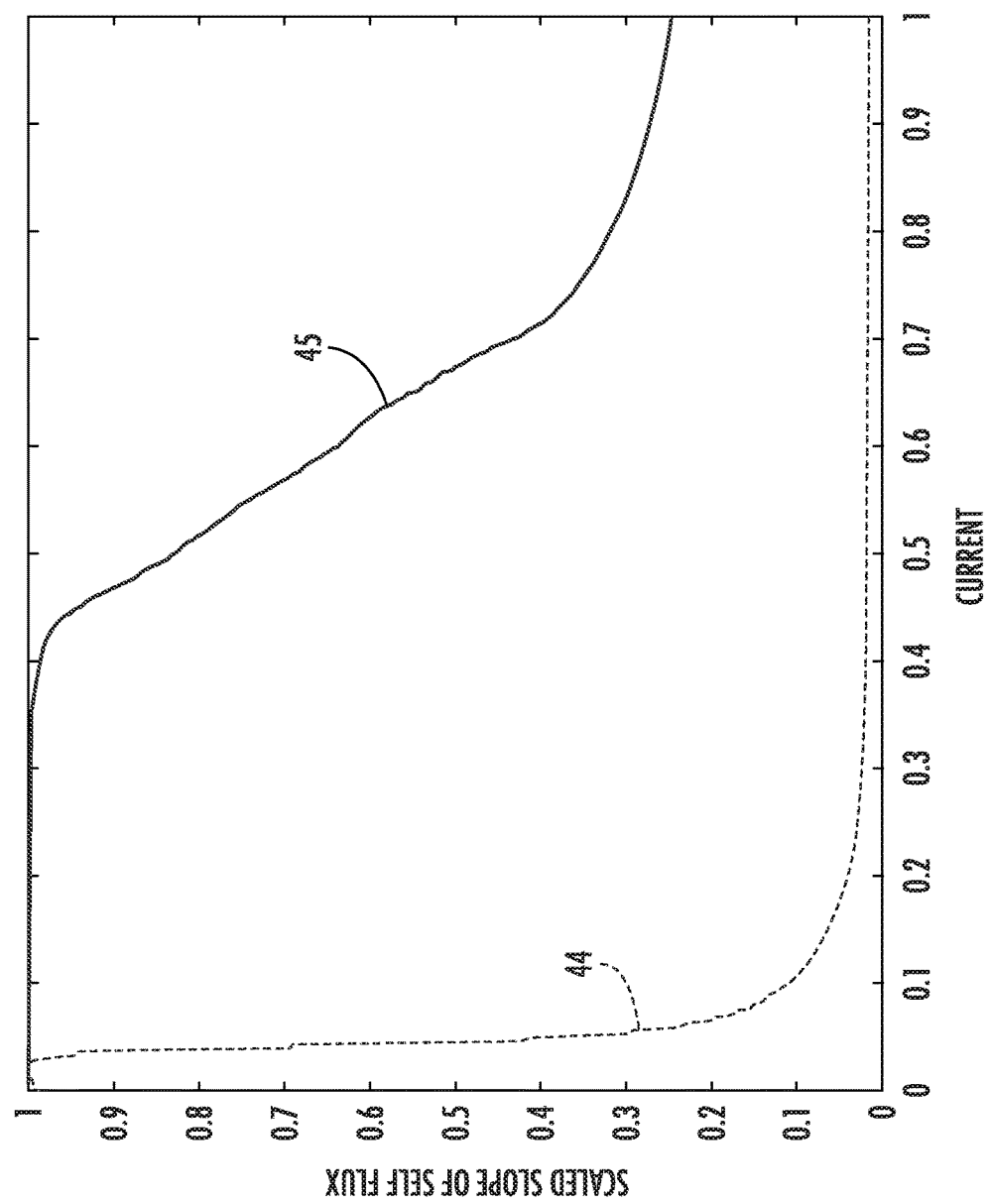
FIG. 9 is a graph similar to FIG. 8 but with the slopes of the self flux scaled to a value of 1.0 or less.
Figure 10:
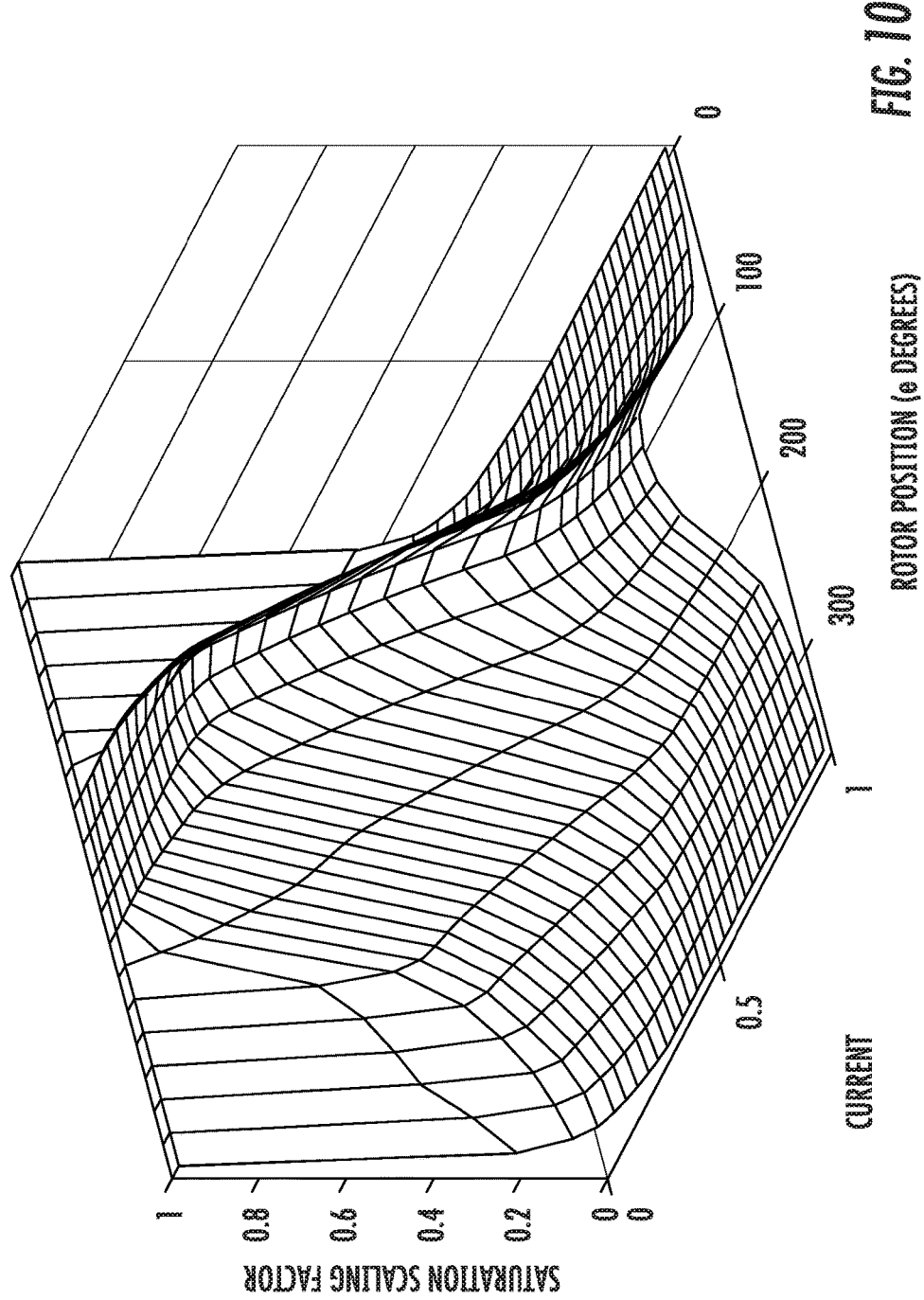
FIG. 10 is a 3-D graph of saturation scaling factors corresponding to the self flux of FIG. 4.

In order to provide consistency between the curves of the slopes and prevent some curves from dominating others, the curves corresponding to the slopes may be normalized or scaled so that the maximum saturation scaling factor is 1.0. As a further example, a normalized curve or saturation scaling factor corresponding to the curve 41 is depicted at 44 in FIG. 9 and a normalized curve corresponding to the curve 42 is depicted at 45 in FIG. 9. FIG. 10 depicts a 3-D graph of the saturation scaling factor data corresponding to the self flux graph of FIG. 4.

Figure 11:
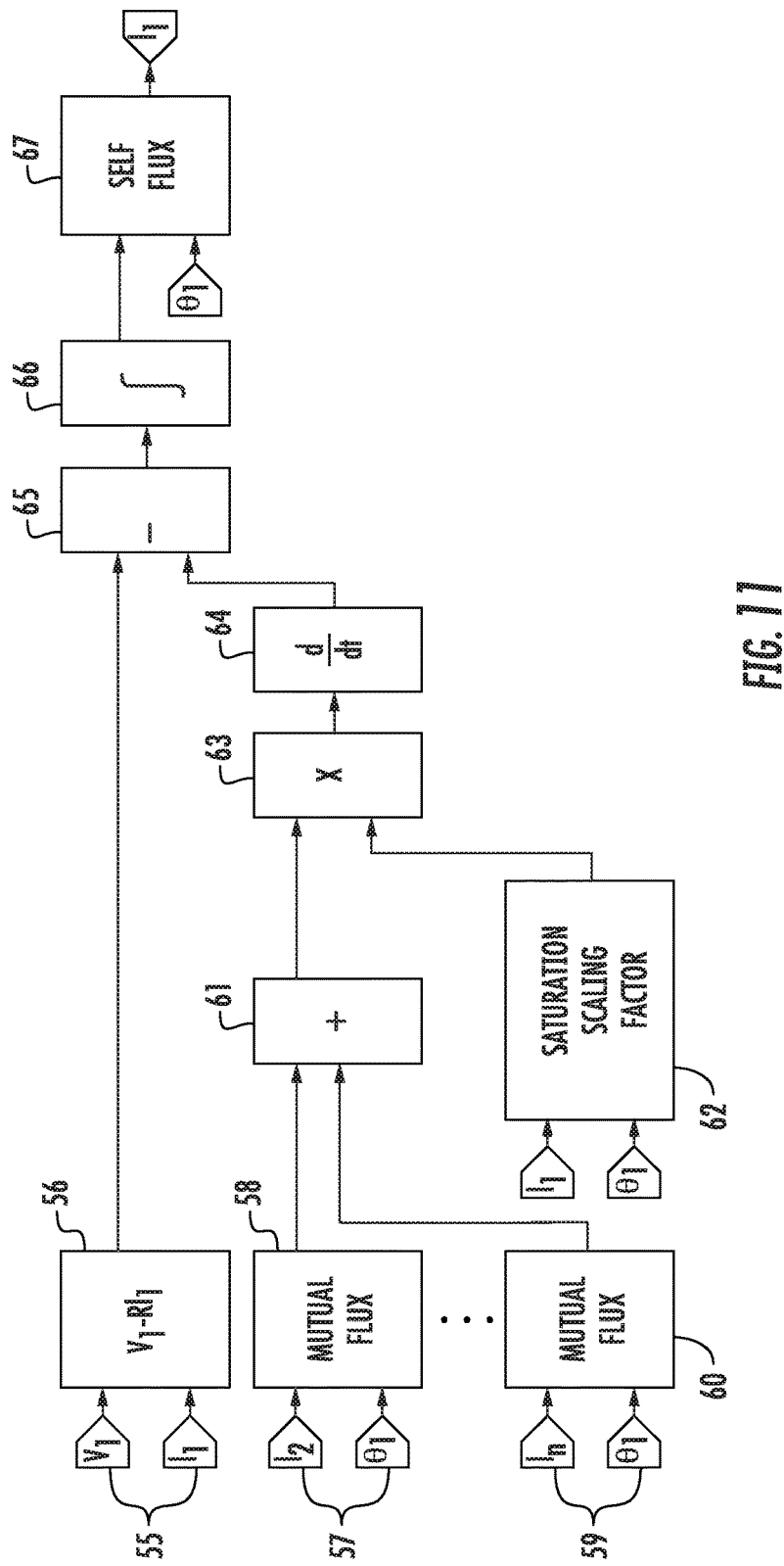
FIG. 11 is a flowchart illustrating a process for dynamic analysis of the input current for a switched reluctance motor.

Referring back to FIG. 3, at stage 54, a dynamic analysis of the switched reluctance motor 25 may be performed. Inasmuch as the voltage, current, and rotor position of each phase is constantly changing during the operation of the motor and the mutual flux from the other phases will oppose the self flux of a phase, a more accurate depiction or analysis of the switched reluctance motor performance may be desirable. Referring to FIG. 11, a flowchart depicts the details of a dynamic analysis at stage 54. An input voltage $V_1$ and an input current $I_1$ for the first phase are selected at stage 55. The input current $I_1$ is a function of the input voltage $V_1$. At stage 56, the voltage drop due to the phase resistance is subtracted from the input voltage $V_1$. The voltage drop due to the phase resistance is determined by multiplying the input current $I_1$ by the resistance R of the phase.

The rotor position $\theta_1$ relative to the first phase and an input current $I_2$ for the second phase as a function of or based upon the input voltage of the second phase $V_2$ and the current in the other phases are set at stage 57. At stage 58, the mutual flux within the first phase as a result of the input current $I_2$ from the second phase and based upon the rotor position $\theta$ may be determined, such as through the use of the mutual flux graph depicted in FIG. 5.

At stage 59, the input current In for each additional phase as a function of or based upon the input voltages $V_n$ of the respective additional phases are set. At stage 60, the mutual fluxes within the first phase as a result of the input current In from each additional phase and based upon the rotor position $\theta_1$ relative to the first phase may be determined. In the depicted example of the switched reluctance motor 25, the mutual inductance within the first phase as a result of the input current $I_3$ from the third phase may be determined through the use of the mutual flux graph depicted in FIG. 6.

Each of the mutual fluxes within the first phase as a result of input currents from the other phases may be added together at stage 61 to generate a gross or total mutual flux as a result of input currents from the other phases.

The saturation scaling factor may be set at stage 62 based upon the input current $I_1$ for the first phase and the rotor position $\theta_1$ relative to the first phase, such as through the use of the saturation scaling factor graph depicted in FIG. 10. At stage 63, the scaled total mutual flux may be determined by multiplying the total mutual flux from stage 61 by the saturation scaling factor from stage 62. The resulting voltage drop due to the mutual flux may be determined at stage 64 by taking the derivative with respect to time of the scaled total mutual flux.

Figure 12:
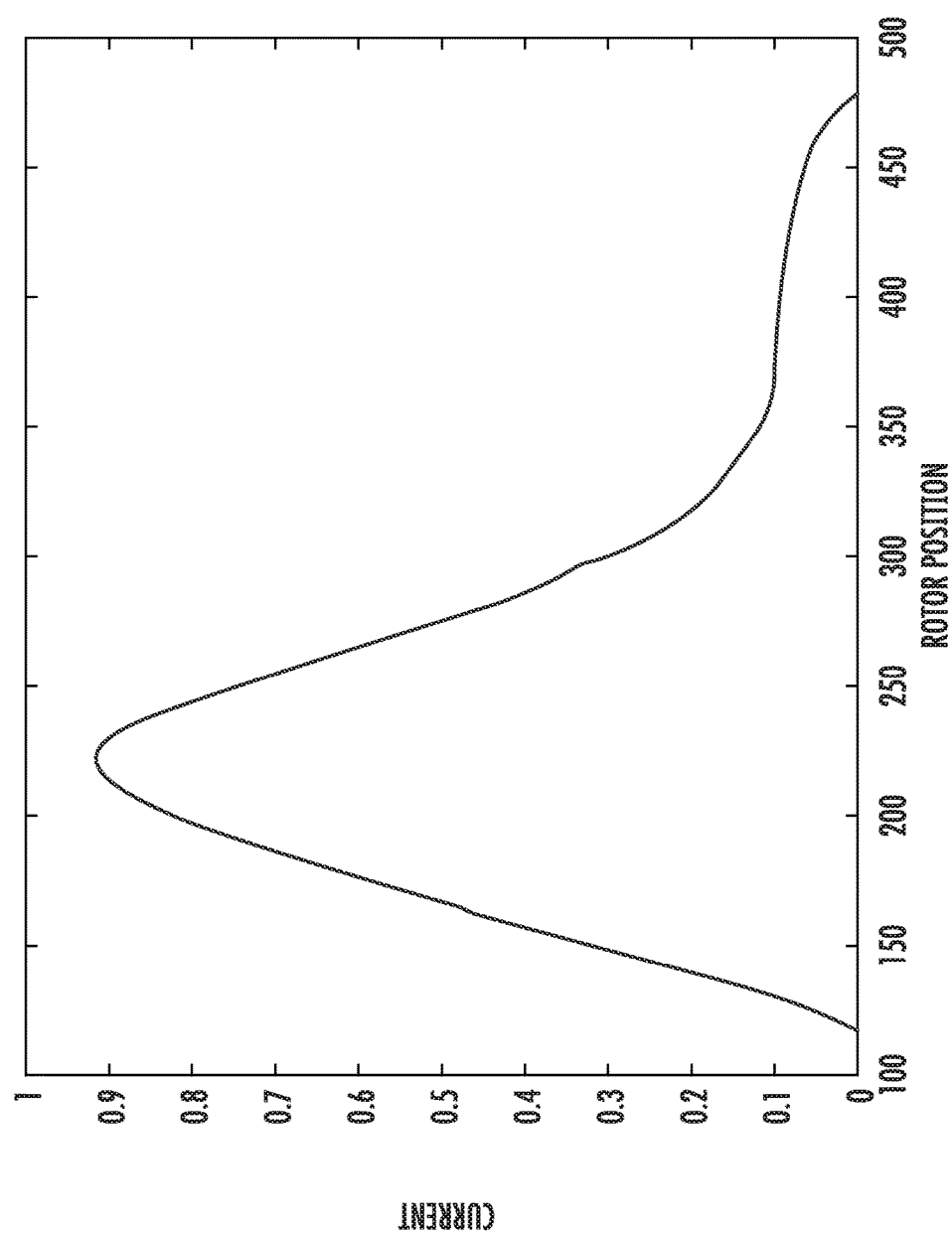
FIG. 12 is an exemplary graph of output of the dynamic analysis depicting one input current as a function of the rotor position.

At stage 65, the voltage drop due to the self flux of the first phase may be determined by subtracting the voltage due to the mutual flux determined at stage 64 from difference between the input voltage $V_1$ of the first phase and the voltage drop due to the phase resistance R. The resulting voltage drop due to the self flux of the first phase may be integrated at stage 66 to determine the self flux. At stage 67, the actual current $I_1$ of the first phase for the next iteration of time may be determined based upon the self flux determined at stage 66 and the rotor position $\theta_1$ relative to the first phase, such as through the use of the self flux graph depicted in FIG. 4. A more accurate calculation of the input current as function of the rotor position $\theta_1$ relative to the first phase may thus be generated since the calculation not only accounts for the self flux and the mutual flux as a result of other phases, but also accounts for the saturation of the energized coil 28. The process depicted by the flowchart of FIG. 11 may be repeated for each rotor position $\theta_1$ to generate a graph of the input current as a function of the rotor position $\theta_1$ as depicted in FIG. 12.

Referring back to FIG. 3, the input current $I_1$ as a function of the rotor position $\theta_1$ may be stored or saved as desired at stage 68. The dynamic analysis of stage 54 depicted in FIG. 11 may be repeated as desired to generate performance graphs for a desired plurality of input currents and voltages as a function of or based upon rotor position $\theta_1$ and the results stored at stage 68.

At decision stage 69, a decision may be made as to whether the analysis and/or design of the switched reluctance motor 25 has been completed. If the analysis and/or design has not been completed, such as, for example, in the case of a simulation, the characteristics of the switched reluctance motor 25 may be changed and stages 51-69 repeated. If the analysis and/or design has been completed at decision stage 69, the results of the dynamic analysis may be stored and associated with the machine 10, such as by storing the input current $I_1$ and the voltages as a function of the rotor position $\theta_1$ within the controller 21 of the machine at stage 70. In another example, the results of the dynamic analysis may be stored remotely from the controller 21 and the controller may access the results.

At stage 71, the torque generated by the switched reluctance motor 25 as a function of or based upon the rotor position $\theta_1$ for each input current $I_1$ may be determined. The torque data may be stored and associated with the machine 10, such as by storing a 3-D graph as depicted in FIG. 13, at stage 72. In another example, the torque data may be stored remotely from the controller 21 and the controller may access the results.

The machine 10 may be operated at stage 73 such as by generating a desired torque request. In doing so, an operator or the controller 21 may request a desired amount of acceleration or that a desired speed be maintained. At stage 74, the controller 21 may determine the minimum input current $I_1$ and the desired rotor positions $\theta_1$ relative to the first phase to generate the desired torque. The controller 21 may determine at stage 75 an electrical input in the form of input voltage $V_1$ magnitude and the timing to generate the desired input current $I_1$ and the desired rotor positions $\theta_1$. At stage 76, the controller 21 may generate an operating command to generate an input voltage $V_1$ with the desired timing to propel the machine as desired.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A control system for a rotary electric machine, the rotary electric machine comprising a stator having a plurality of stator poles, a plurality of coils wrapped around the plurality of stator poles, and a rotor having a plurality of rotor poles, the rotor being rotatable relative to the stator, the control system comprising:

a rotor position sensor configured to determine an angular position of the rotor relative to the stator;

a controller configured to:
 access a plurality of characteristics of the rotary electric machine, the plurality of characteristics including a number of the plurality of stator poles, a number of the plurality of rotor poles, a number of electrical phases, and a number of windings of each of the plurality of coils;
 access a plurality of self flux data, the plurality of self flux data being a function of the angular position of the rotor;
 access a plurality of mutual flux data between an energized electrical phase and a non-energized electrical phase of the rotary electric machine, the plurality of mutual flux data being a function of the angular position of the rotor;
 access a plurality of saturation scaling factor data, the plurality of saturation scaling factor data being based upon the plurality of self flux data;
 generate a plurality of dynamic input current data based upon a dynamic analysis of the plurality of self flux data, the plurality of mutual flux data, and the plurality of saturation scaling factor data;
 generate a torque request corresponding to a desired output torque;

determine a desired electrical input based upon the plurality of dynamic input current data to generate torque corresponding to the desired output torque, the desired electrical input including a magnitude and duration of an electrical pulse and a desired angular position of the rotor relative to the stator;

determine an angular position of the rotor based upon the rotor position sensor; and generate an operating command to generate the desired electrical input at the desired angular position of the rotor to propel the rotary electric machine and generate the desired output torque.

2. The control system of claim 1, wherein the plurality of saturation scaling factor data is based upon a rate of change of the plurality of self flux data.

3. The control system of claim 2, wherein the plurality of saturation scaling factor data is normalized to provide a maximum value of 1.0.

4. The control system of claim 1, wherein the plurality of self flux data is further a function of a current supplied to an energized phase of the rotary electric machine.

5. The control system of claim 4, wherein the controller is configured to generate the plurality of self flux data through a static analysis of the rotary electric machine.

6. The control system of claim 1, wherein the plurality of mutual flux data is further a function of a current supplied to a non-energized phase of the rotary electric machine.

7. The control system of claim 6, wherein the controller is configured to generate the plurality of mutual flux data through a static analysis of the rotary electric machine.

8. The control system of claim 1, wherein the rotary electric machine includes three phases, and the controller is further configured to access a second plurality of mutual flux data between the energized electrical phase and a second non-energized electrical phase.

9. The control system of claim 8, wherein the second plurality of mutual flux data is further a function of a second current supplied to a second non-energized electrical phase of the rotary electric machine.

10. The control system of claim 1, further comprising a power source operatively connected to the plurality of coils to provide electrical pulses to the coils and wherein the desired electrical input includes a voltage pulse having a desired magnitude, timing and duration.

11. A method of controlling a rotary electric machine, the rotary electric machine comprising a stator having a plurality of stator poles, a plurality of coils wrapped around the plurality of stator poles, and a rotor having a plurality of rotor poles, the rotor being rotatable relative to the stator, the method comprising:

accessing a plurality of characteristics of the rotary electric machine, the plurality of characteristics including a number of stator poles, a number of rotor poles, a number of electrical phases, and a number of windings of each of the plurality of coils;

accessing a plurality of self flux data, the plurality of self flux data being a function of an angular position of the rotor;

accessing a plurality of mutual flux data between an energized electrical phase and a non-energized electrical phase, the plurality of mutual flux data being a function of the angular position of the rotor;

accessing a plurality of saturation scaling factor data, the plurality of saturation scaling factor data being based upon the plurality of self flux data;

generating a plurality of dynamic input current data based upon a dynamic analysis of the plurality of self flux data, the plurality of mutual flux data, and the plurality of saturation scaling factor data;

generating a torque request corresponding to a desired output torque;

determining a desired electrical input based upon the plurality of dynamic input current data to generate torque corresponding to the desired output torque, the desired electrical input including a magnitude and duration of an electrical pulse and a desired angular position of the rotor relative to the stator;

determining a rotor position based upon a rotor position sensor; and generating an operating command to generate the desired electrical input at the desired angular position of the rotor to propel the rotary electric machine and generate the desired output torque.

12. The method of claim 11, wherein the plurality of saturation scaling factor data is based upon a rate of change of the plurality of self flux data.

13. The method of claim 12, wherein the plurality of saturation scaling factor data is normalized to provide a maximum value of 1.0.

14. The method of claim 11, wherein the rotary electric machine includes three phases, and further including accessing a second plurality of mutual flux data between the energized electrical phase and a second non-energized electrical phase.

15. The method of claim 14, wherein the second plurality of mutual flux data is further a function of a second current supplied to a second non-energized electrical phase of the rotary electric machine.

16. The method of claim 11, wherein the desired electrical input includes a voltage pulse having a desired magnitude, timing and duration.

17. A rotary electric machine comprising:

a stator having a plurality of stator poles;

a plurality of coils wrapped around the plurality of stator poles;

a rotor having a plurality of rotor poles, the rotor being rotatable relative to the stator;

a rotor position sensor configured to determine an angular position of the rotor relative to the stator;

a controller configured to:

access a plurality of characteristics of the rotary electric machine, the plurality of characteristics including a number of the plurality of stator poles, a number of the plurality of rotor poles, a number of electrical phases, and a number of windings of each of the plurality of coils;

access a plurality of self flux data, the plurality of self flux data being a function of the angular position of the rotor;

access a plurality of mutual flux data between an energized electrical phase and a non-energized electrical phase of the rotary electric machine, the plurality of mutual flux data being a function of the angular position of the rotor;

access a plurality of saturation scaling factor data, the plurality of saturation scaling factor data being based upon the plurality of self flux data;

generate a plurality of dynamic input current data based upon a dynamic analysis of the plurality of self flux data, the plurality of mutual flux data, and the plurality of saturation scaling factor data;

generate a torque request corresponding to a desired output torque;

determine a desired electrical input based upon the plurality of dynamic input current data to generate torque corresponding to the desired output torque, the desired electrical input including a magnitude and duration of an electrical pulse and a desired angular position of the rotor relative to the stator;

determine an angular position of the rotor based upon the rotor position sensor; and generate an operating command to generate the desired electrical input at the desired angular position of the rotor to propel the rotary electric machine and generate the desired output torque.

18. The rotary electric machine of claim 17, wherein the plurality of saturation scaling factor data is based upon a rate of change of the plurality of self flux data.

19. The rotary electric machine of claim 18, wherein the plurality of saturation scaling factor data is normalized to provide a maximum value of 1.0.

20. The rotary electric machine of claim 19, further comprising a power source operatively connected to the plurality of coils to provide electrical pulses to the coils and wherein the desired electrical input includes a voltage pulse having a desired magnitude, timing and duration.

* * * * *